United States Patent
Balasubramanian et al.

(10) Patent No.: US 6,441,923 B1
(45) Date of Patent: Aug. 27, 2002

(54) DYNAMIC CREATION OF COLOR TEST PATTERNS BASED ON VARIABLE PRINT SETTINGS FOR IMPROVED COLOR CALIBRATION

(75) Inventors: Thyagarajan Balasubramanian; Reiner Eschbach; Paul G. Roetling, all of Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/340,848

(22) Filed: Jun. 28, 1999

(51) Int. Cl.[7] ............................. G06F 15/00; H04N 1/46
(52) U.S. Cl. ....................... 358/3.23; 358/504; 358/536
(58) Field of Search .................. 358/455, 456, 358/534, 533, 3.23, 518, 519, 521, 522, 536, 538, 523, 524, 504; 382/162, 167, 168, 169, 170

(56) References Cited

U.S. PATENT DOCUMENTS

| | | | |
|---|---|---|---|
| 2,790,844 A | 4/1957 | Neugebauer | 358/518 |
| 4,275,413 A | 6/1981 | Sakamoto et al. | 358/525 |
| 4,500,919 A | 2/1985 | Schreiber | 358/518 |
| 5,170,257 A * | 12/1992 | Burns | 358/298 |
| 5,305,119 A | 4/1994 | Rolleston et al. | 358/518 |
| 5,416,613 A | 5/1995 | Rolleston et al. | 358/518 |
| 5,452,112 A * | 9/1995 | Wan et al. | 358/504 |
| 5,457,541 A * | 10/1995 | Burns | 358/298 |
| 5,471,324 A | 11/1995 | Rolleston | 358/518 |
| 5,483,360 A | 1/1996 | Rolleston et al. | 358/518 |
| 5,649,072 A | 7/1997 | Balasubramanian | 358/518 |
| 5,734,802 A | 3/1998 | Maltz et al. | 358/518 |
| 5,739,927 A | 4/1998 | Balasubramanian | 358/518 |
| 6,040,927 A * | 3/2000 | Winter et al. | 358/534 |

OTHER PUBLICATIONS

Po–Chieh Hung, "Colorimetric Calibration for Scanners and Media", SPIE, vol. 1448, Camera and Input Scanner System (1991).

* cited by examiner

Primary Examiner—Kimberly A. Williams
(74) Attorney, Agent, or Firm—Mark Costello; Mark Z. Dudley

(57) ABSTRACT

A method for calibrating a printer includes printing a set of color samples with the printer, the set of samples or calibration target generated dynamically in response to selected printer variables, and reflecting at least a portion of the printer gamut. Each printed color sample in the set of samples is measured calorimetrically, to determine the printer's response thereto, so that a calibration table can be generated, taking into account printer variables selected by a user.

17 Claims, 4 Drawing Sheets

DYNAMIC CREATION OF COLOR TEST PATTERNS BASED ON VARIABLE PRINT SETTINGS FOR IMPROVED COLOR CALIBRATION

CROSS REFERENCE

Cross-reference is made to concurrently filed patent application Ser. No. 09/340,884 by T. Balasubramanian, R. Eschbach and P. Roetling.

The present invention is directed to printer color calibration techniques, for determining printer response to input images, and more particularly, to a method of automatically creating color test patterns for selected variable print settings over the printer color gamut in which improved calibration is required.

BACKGROUND OF THE INVENTION

The generation of color documents can be thought of as a two step problem: first, the generation of an image, for example, by scanning an original document with a color image input terminal or scanner, or creation of a color image on a work station operated in accordance with a color image creation program; and second, printing of that image with a color printer in accordance with colors defined by the scanner or computer generated image.

The problem is that scanner and computer program output is commonly provided in a color space of tristimulus appearance values, i.e., RGB (red-green-blue). Commonly, these values are a transformation of the standard XYZ coordinates of CIE color space. Color descriptions that can be uniquely and analytically transformed to XYZ are commonly referred to as, "device independent".

Printers, however, commonly have an output that is defined as existing in a colorant-defined color space called CMYK (cyan-magenta-yellow-key or black) which is uniquely defined for the printer by its capabilities and colorants. Printers operate by the addition of multiple layers of ink or colorant in layers to a page. The response of the printer tends to be relatively non-linear. Colors are defined for a particular device, and accordingly reference is made to the information as being "device dependent". Thus, while a printer receives information in a device independent color space, it must convert that information into a device dependent color space for printing, which reflects the gamut or possible range of colors of the printer. Printers may print with colorants beyond CMYK, for a variety of special purposes or to extend the device gamut.

The desirability of operating in a device independent color space with subsequent conversion to a device dependent color space is well known, as shown by U.S. Pat. No. 4,500,919 to Schreiber, U.S. Pat. No. 2,790,844 to Neugebauer, and U.S. Pat. No. 4,275,413 to Sakamoto and others. There are many methods of conversion between color spaces, all of which begin with the measurement of printer response to certain input values. Commonly, a printer is driven with a set of input values reflecting color samples throughout the printer gamut. Subsequently, the colorimetric response of the printers to the input value is measured, so that printed colors are mapped to device independent values. A table, mapping printer output values to colorimetric input values can be created.

In U.S. Pat. No. 4,275,413 to Sakamoto, the information derived is placed into look up tables, stored in a memory, perhaps ROM memory or RAM memory where the look up table relates input color space to output color space. The look up table is commonly a three-dimensional table since color is defined with three variables. In RGB space, at a scanner or computer, space can be defined as three-dimensional with black at the origin of a three dimensional coordinate system 0, 0, 0. White is represented at the maximum of a three dimensional coordinate system which in an B-bit system, would be located at 255, 255, 255. Each of the three axes radiating from the origin point therefore respectively defines red, green, and blue. In the 8-bit system suggested, there will be, however, over 16 million possible colors ($256^3$). There are clearly too many values for a 1:1 mapping of RGB to CMY, CMYK or any other device dependent color space. Therefore, the look up tables provide a set of node values which could be said to be the intersections for corners of a set of colors distributed through the gamut of the input device. Colors falling within each three dimensional volume defined by a set of nodes can be interpolated from the node values, through many methods including tri-linear interpolation, tetrahedral interpolation, polynomial interpolation, linear interpolation, and any other interpolation method depending on the desired accuracy of the result. U.S. Pat. No. 5,483,360 to Rolleston, U.S. Pat. No. 5,649,072 to Balasubramanian, U.S. Pat. No. 5,739,927 to Maltz and Balasubramanian and 5,734,802 to Harrington et al. all provide further details regarding table construction. Calibration table construction is a time consuming process, due to the large number of samples that must be printed, scanned and evaluated. All of the immediately above patents note the problem that, after a change in process parameters due to time, change of materials, refilling toner, component aging, etc., a change in calibration is required, but perhaps only in a portion of the overall color gamut of a printer. U.S. Pat. No. 5,416,613 to Rolleston addresses the desire to create a calibration target or pattern, comprising a set of calibration patches or samples that provides "checks" for machine operational defects, e.g., redundancy in color patches or samples is provided to assure that aberrations in printer response are not localized printer defects.

In addition to the problems of drifting or changing parameters, the actual creation of a calibration target or pattern can create problems. For example, colors, or halftones in portions of the printer gamut that stress the printer, might display "noise" in their creation. Different halftones will create different stress areas. As an example, moiré between halftones in two separations, will have a relatively low frequency, and may not be apparent in a single color patch on a calibration target. However, the difference in color between the peak and the trough of the image due to such moiré will dramatically alter the color of the patch.

Such noise produces inaccuracies in the calibration table. If table calibration is based on such inaccuracies, the reproduction system will not work properly.

Models of printer behavior are often created to attempt to predict printer response. The use of such models, if accurate, could greatly simplify calibration. However, noise in the calibration process renders the models difficult to apply. One particular printer model is referred to as the Neugebauer model (Yule, "Principles of Color Reproduction", John Wiley & Sons, 1967) that assumes that the color of the output print is a weighted average of a set of primary colors and white paper. The model describes the primary colors as overprinted masses of colorants C, M, Y, K. The model assumes an ideal printer for each primary color.

The references cited herein are incorporated by reference for their teachings.

SUMMARY OF THE INVENTION

In accordance with the invention, there is provided a method and apparatus for dynamically creating color calibration targets or patterns, generated based on particular variable print setting parameters selected.

Here we understand "variable print settings" to be all machine settings that can be explicitly or implicitly influenced by the operator and that directly or indirectly affect color reproduction. Color patterns or targets for calibration are created to optimize calibration based on a selected printer model and its selected printing capabilities, and comparisons to actual physical measurements. Here, we use the term "printer model" to comprehend predictive models, whether they are in analytical, numerical or any other implementable form.

In accordance with one aspect of the invention, there is provided a method for calibrating a printer comprising determining at least one variable print setting; using said determined settings to generate a setting dependent calibration sheet; measuring each printed color sample in said calibration sheet; using said measurements to generate a color calibration table for use by said printer in converting device independent colors to device dependent colors.

In accordance with yet another aspect of the invention, there is provided a method of calibrating a printer by printing a first set of color samples, generated in accordance with at least one variable print setting and representative of at least a portion of a printer gamut; comparing said first set of color samples with a predictive model of printer behavior for said portion of said printer gamut; generating a new set of color samples in areas where a difference between said first set of color and said predictive model is greater than desired; and using said first set of color samples and said new set of color samples to calibrate said printer.

Calibration of the entire space is costly in terms of processing time. It is desirable to only recalibrate a portion of the color space, or alternatively, to use the best portions of the color space mapping. It would also be desirable to base such calibration on a selected set of known printer parameters. It may also be desirable to improve the response in certain portions of the color space, perhaps by providing more sample information, at critical areas. In any case, there is often a need to provide a set of samples for calibration table generation or regeneration which test printer response to certain printer parameters, such as particular halftoning schemes, TRC curves, and the like. The invention allows a reduction in the effort needed to calibrate a printer, and a reduced need for expert intervention in the calibration process.

In practice an initial color calibration pattern is generated, in a dynamic manner, by either selecting from a set of pre-stored calibration patterns or by on-the-fly creation, based on printer parameters, and knowledge of how the printer should respond to those parameters. The resulting calibrations pattern and is printed and measured. As always, there is noise in the measurement and there are printer non-uniformities. These measurements will result in a table more accurately representing the color performance of any given printer.

After the first pattern is measured, the user has the option to use the current calibration or to fine-tune the calibration. In one use of the dynamically created calibration pattern or target, the initial measurement is analyzed, and the system determines problematic areas by comparison of the measurements with a printer model. A simple way to do this is to determine the change in gradient in color space of the calibration function as compared to an expected performance, or the change in curvature of the calibration function. This gives a strong indication of problems caused from noise (noise will introduce local deviations from a smooth behavior), and/or problems caused by printer halftoning problems. It should be noted that two identical color patches resulting in different measured responses is an obvious case for such a deviation. A dynamically generated calibration sheet will include more color patches in the appropriate regions of the printer operational parameters to either eliminate observed noise or improve the printer modeling. At the same time, the number of patches in smooth color space regions (estimated from the initial measurement) is reduced, thereby increasing the overall calibration efficiency.

The invention may take form in various components and arrangements of components, and in various steps and arrangements of steps. The drawings are only for purposes of illustrating a preferred embodiment and are not to be construed as limiting the invention:

Figure 1:
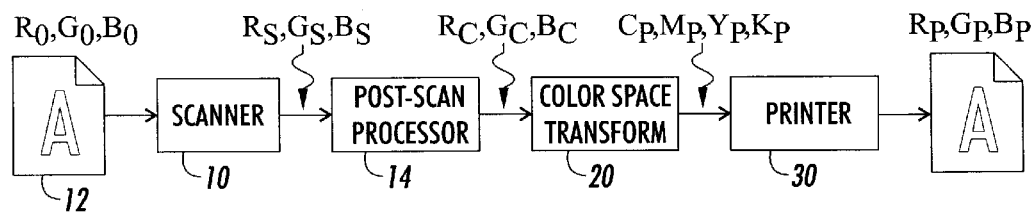
FIG. 1 illustrates a printing system in which the present invention finds advantage.
Figure 3:
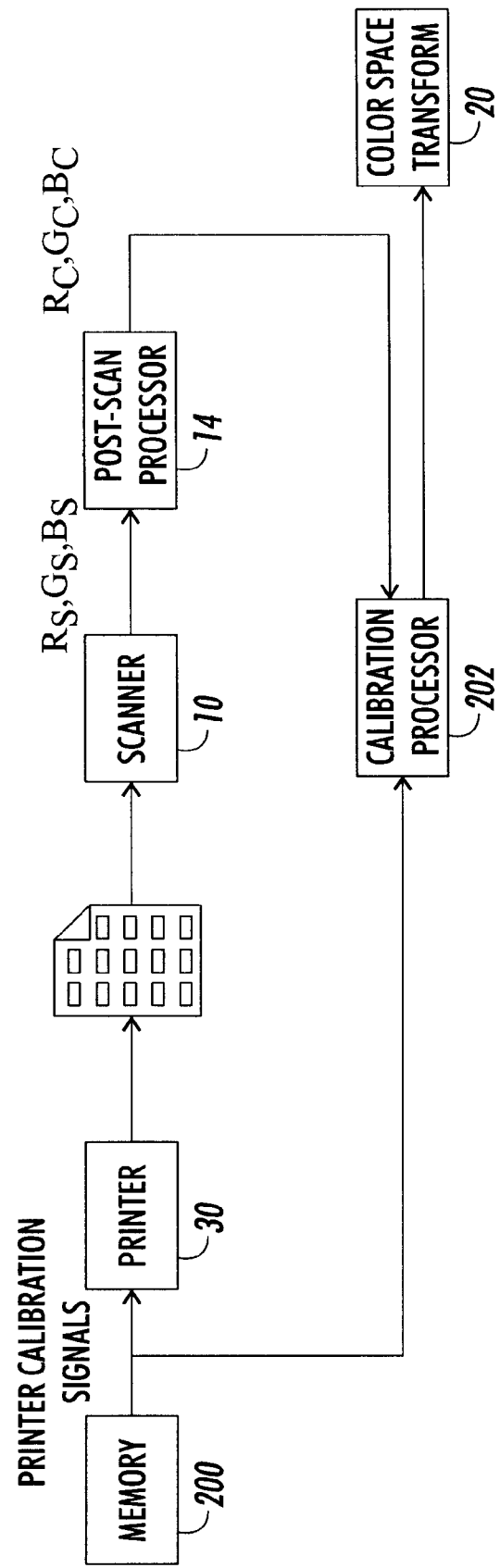
Figure 4C:
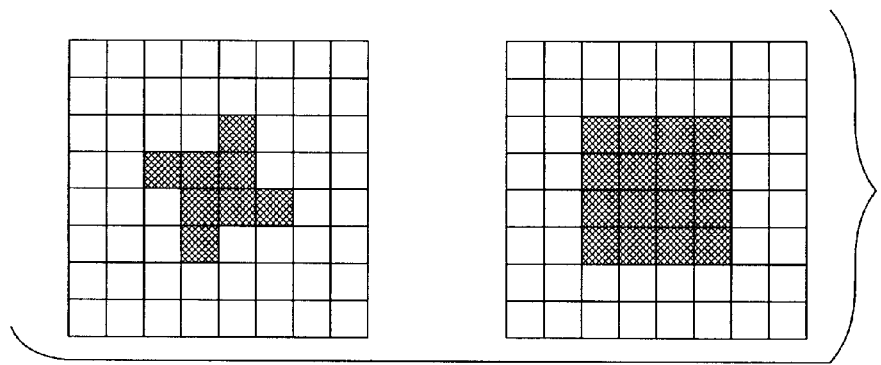
Figure 4B:
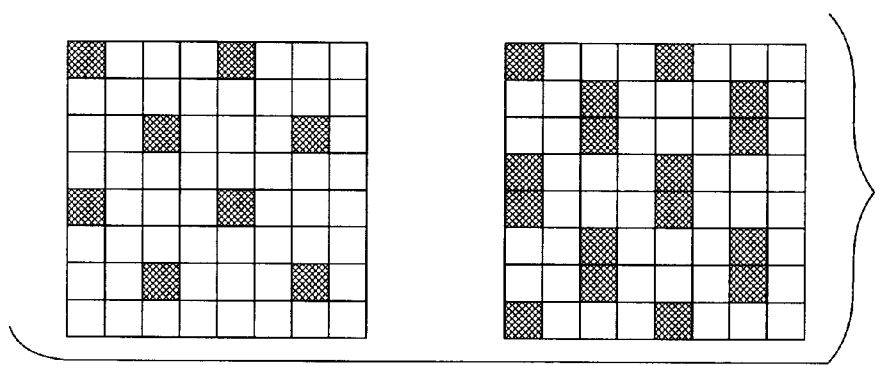
Figure 4A:
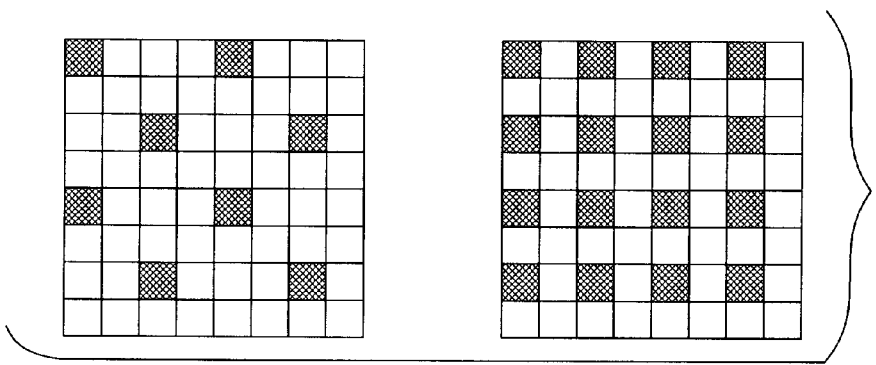
Figure 5:
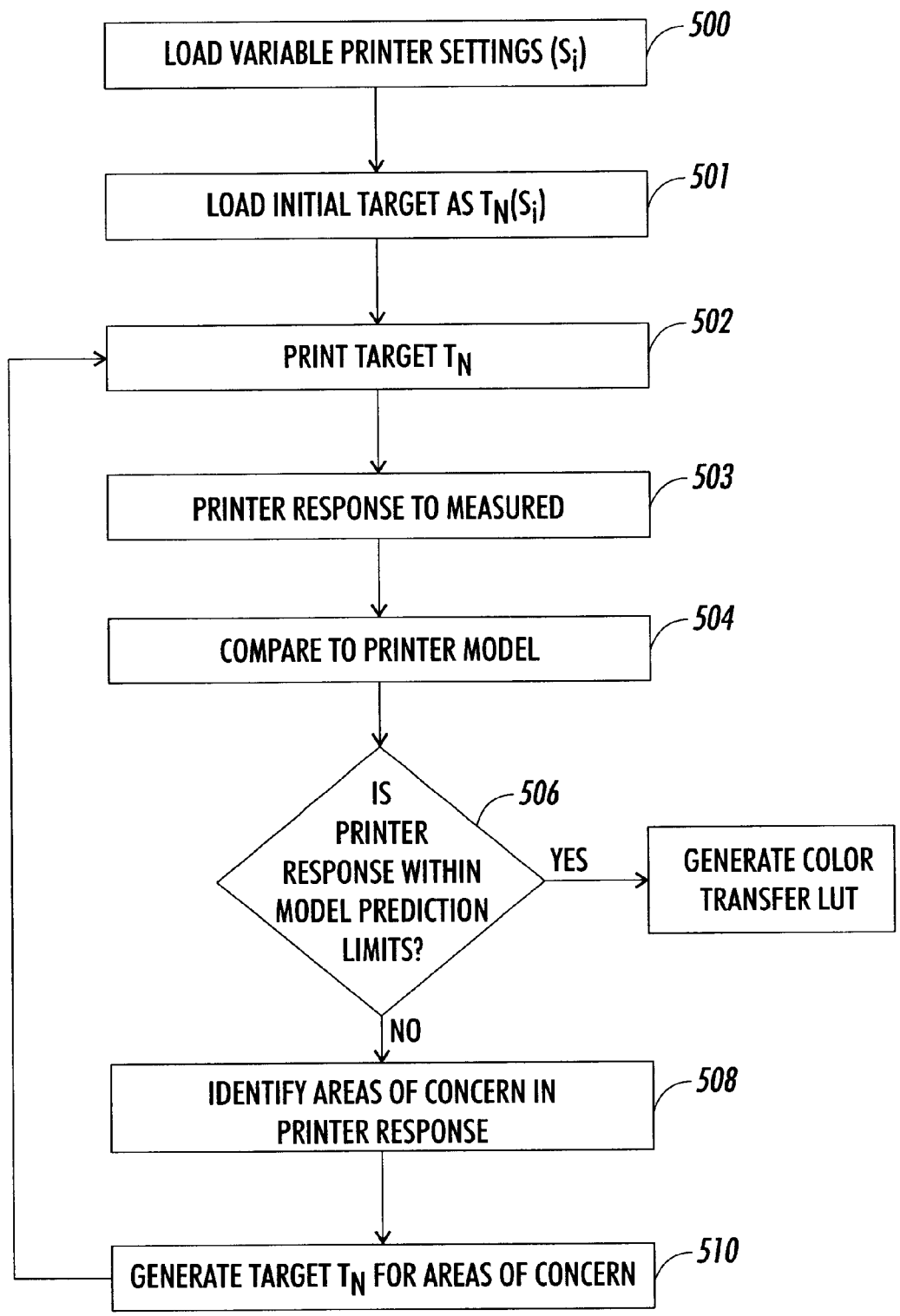

FIG. 3 provides a function block diagram of the calibration process, as it might be implemented for a system like FIG. 1;

FIGS. 4A, 4B and 4C illustrate the case where variable print setting parameters are used in the generation of the initial or later calibration sheet; and FIG. 5 shows a flowchart explaining the processing steps of the iterative method.

Referring now to the drawings where the showings are for the purpose of describing an embodiment of the invention and not for limiting same, a basic system for carrying out the present invention is shown in FIG. 1. In such a system, a scanner 10, such as perhaps the color scanner available in Xerox 5790 digital color copiers, can be calibrated to produce a set of digital calorimetric or device independent data. An original image 12 rendered in colors $R_0$, $G_0$, $B_0$, which, by definition, can be defined in terms of a calorimetric R, G, B (red-green-blue) space, is provided to the scanner resulting in a set of scanner image signals $R_s$, $G_s$, $B_s$, defined in device dependent scanner terms. Incorporated into the scanner or another processing path is a post-scanning processor 14, which uses the scanner calibration transform to provide a correction of scanner image signals $R_s$, $G_s$, $B_s$, to colorimetric terms, $R_c$, $G_c$, $B_c$, usually digital in nature. The values may be in terms of CIE color space (rgb), or the L*,a*,b, or luminance-chrominance space ($L, C_1, C2$) or a linear transform thereof.

A color space transform, indicated by block 20, is used to convert the device independent data to device dependent data. The output of color space transform 20 is the image defined in terms of a device dependent space, or printer colorant signals $C_p$, $M_p$, $Y_p$, $K_p$ that will be used to drive a printer 30. In one possible example, the colorant signals represent the amounts of cyan, magenta, yellow, and black toners to be deposited over a given area in an electrophotographic printer. The printed output image may be said to be defined in terms of $R_p$, $G_p$, $B_p$, a measured response, that is hoped to have a relationship with $R_0$, $G_0$, $B_0$ such that the printed output image has a color that is calorimetrically similar to the original image, although that similarity is ultimately dependent upon the gamut of the printing device.

When referring to colorimetric spaces, the reference is to color space definitions that are transforms of CIE XYZ space (1931). When we refer to device dependent space, we refer to a color space that is defined only in terms of operation of the device using it. While many color spaces have three dimensions, it is possible to have color spaces with less than three dimensions or more than three dimensions and likewise, it is possible for printers to use less than three colorants or more than four colorants.

Figure 2:
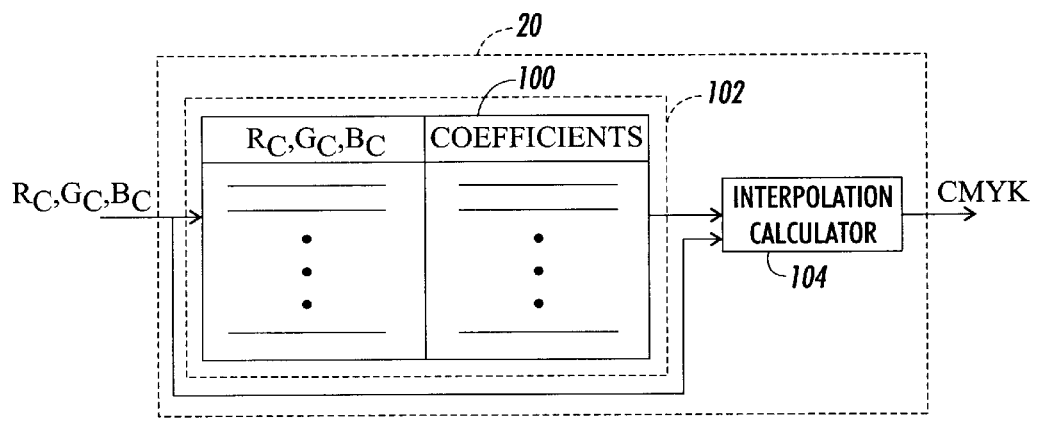
FIG. 2 illustrates a portion of the calibration system in a system like FIG. 1.

With reference now to FIG. 2, color space transform 20, initially receives $R_c$, $G_c$, $B_c$ color signals. These signals are directed to the interpolation calculator along with the lookup table 100 stored in memory 102. This arrangement provides a three-dimensional look up arrangement in a device memory such as a RAM or other addressable memory device, which will meet speed and memory requirements for a particular device. Color signals $R_c$, $G_c$, $B_c$ are processed to generate address entries to a table which stores a set of transform coefficients, with which the signals $R_c$, $G_c$, $B_c$ may be processed to convert them to C, M, Y, K colorant signals or any multi-dimensional output color space including but not limited to CMYK or spectral data. Values that are not mapped may be determined through interpolation. As described in U.S. Pat. No. 5,305,119 under color removal and gray balance processing may also be combined into the color space transform element. Although these features are not required, they are desirable and are illustrated herein.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values.

To create a complete calibration table, a target with a set of color patches is created, perhaps including desired linearization and black addition. This is done by printing and measuring between 300 and 1000 patches of printer colors distributed throughout the color space, i.e., a large set of printer driving signals are generated, in varying densities of combinations of C, M, Y, K, or other printer colors and used to drive the printer. The color of each patch is measured using a spectrophotometer, or possibly the scanner of the system itself, or any other appropriate color measurement device, to determine color in terms of $R_c$, $B_c$, $G_c$. The measured colors of these patches are used to build a multi-dimensional look up table (LUT) to map $R_c$, $B_c$, $G_c$ defined colors to C, Y, M, K defined colors. Conversions that do not include mapped and measured points may be interpolated or extrapolated. Reference is made to U.S. Pat. No. 5,416,613 that shows and describes a calibration test pattern for this purpose.

It should be understood that $R_c$, $B_c$, $G_c$ input is used as example only, and that any other colorimetric description might be used on the input. It should also be noted that the color measurement instrumentation might be partly or entirely incorporated into the color printer. In such instances, the dynamic color calibration sheet might be an actually printed piece of paper, or a known part or area of an intermediate image carrier. It is appreciated that reducing the number of patches to be measured is likewise important in manual and automatic calibration situations.

A calibration pattern or target includes of a number of patches preferably, although not necessarily, on a single page. Since the minimum size of a patch on a page is determined by external factors (measuring equipment, time to measure all patches, etc.), only a limited number of patches can be printed on a single sheet. In practice, the number of color patches on a single A4 or 8.5×11 page is limited to 200 to 300 patches. With this number of patches, the linearity of the individual C, M, Y, K components has to be determined, as well as the interaction between different components or separations. To get a better feel for the relative number of patches, one should remember that tables with 4096 entries are commonly created and used.

One problem in creating the calibration pattern is caused by the ability to use different printer settings on a machine. These settings might be selected from a list of stored settings, or might be freely changed by the user. One characteristic that is often changed by the user is the halftoning. It is important to notice that the halftone settings have a strong influence on printer stability and noise.

With reference now to FIG. 3, a starting calibration pattern or target is selected from a set conveniently stored in a device memory such as calibration ROM 200, RAM, floppy or the like, or generated on the fly with a predetermined generation function. If selected from a stored set of calibration targets, each calibration pattern may be pre-generated for use with particular variable printer settings. From the calibration image, a print of the calibration pattern is made at printer 30, to produce an image. Scanner 10 and post scan processor 14 are used to scan the calibration target and produce response signals as a function of sensed density, representing the colors of each scanned patch. Calibration processor 202 reads the responses provided from post scan processor and correlates the response with the input colorant signals, so that a device independent color to colorant mapping may be generated.

In standard practice, device independent values may be mapped to device dependent space, perhaps in a manner described in U.S. Pat. No. 5,471,324. Alternatively the method of Po-Chieh Hung, "Colorimetric Calibration for Scanners and Media", SPIE, Vol. 1448, Camera and Input Scanner System, (1991), which describes a method of inverse tetrahedral interpolation, may be used to the same effect as the described Shepard's Method. Of course, other methods are possible. With the look up table derived, it may be stored in LUT 100 at color space transform 20, for use in converting device dependent values received from image creators to device independent printer signals.

In accordance with the invention, a dynamic creation process is used to generate calibration test patterns, either by dynamically selecting from a prestored set of test patterns or by creating the test patterns on the fly. The next steps are to measure the samples and use the measured values inside the machine for print color correction. Alternatively, an iterative process might be used as described in co-pending patent application Ser. No. 09/340,884. In the iterative process one compares the samples to a printer model, detects deviations from the expected model in portions of the printer gamut, re-generates calibration test patterns with an emphasis on those parts of the printer gamut that exhibit a large deviation from the model, and uses the measurements of the re-generated calibration target to create a new color transform LUT.

In accordance with the invention the first input into the system might be the set of halftone screens that will be used in the characterization. The system examines the halftone screens and determines (a) the likelihood of validity of a chosen printer model; and (b) the likelihood of printer noise. Here, we use noise to identify printer instability at any point in its operational parameters.

A good estimate of these properties can be derived from the dispersity of the halftone dot. Optionally, other parameters (resolution, screen frequency, etc.) can be included in the process.

A simple measure for the disperity is:

$$D = \left\langle \frac{\sum \text{transitions}}{\sum \text{set\_pixels}} \right\rangle \quad (1)$$

Where "<>" denotes some weighted average over different halftone levels.

"Transition" here refers to the changes from ON-to-OFF or vice versa in the halftone in both vertical and horizontal direction and pixels. Set_pixel refers to "ON" pixels in a halftone screen cell.

FIG. 4 shows an example of three different halftone dots at two different levels, where the left-most dot is an example dispersed dot, the center dot is a mixed dispersed and clustered dot and the right-most dot is a standard clustered dot. The dispersity values for the dispersed dot are 4 at both levels (16 horizontal transitions and 16 vertical transitions for 8 "on" pixels), for the mixed dot 4 and 3, and for the clustered dot 2 and 1. It should be noted that at the very dark and light end, all dots exhibit a similar dispersity and that the biggest differences will appear in the midtones. For simplicity of implementation, we will use the dispersity at ¼, ½, and ¾ as general indicators, although other values are certainly possible.

One straightforward application of the dispersity measure is the inclusion of color patches to determine output noise and color variation. For halftone schemes with a large dispersity number, some redundant patches are included in different places of the characterization target to allow the determination of the printer variability to the halftone dot. This is an important feature, since dispersed—or stochastic—halftone schemes often exhibit a large-scale variation in their color reproduction, particularly near highlights, and neutrals. Comparing the measured values for the redundant blocks will give a direct estimate of the noise that can potentially be used to alert the user to pick a different halftone screen or to initiate an additional measurement-based characterization. For low dispersity numbers printer stability is less of a concern and the noise detection color patches can be removed or even eliminated and the gain can be used to either use less patches resulting in reduced calibration time or can be used to include additional distinct color in the test target resulting in a better calibration accuracy.

Another print setting that influences the printer output is the halftone frequency. Here the influence of the Yule-Nielsen effect increases with increasing halftone frequency resulting in a steepening of the tone reproduction curve in some parts of the color space. A dynamically created calibration sheet might respond to this by increasing the density of patches in that part of color space.

Yet another print setting influencing the color calibration is the gray component replacement and under color removal scheme (GCR/UCR) used. As shown in the co-pending U.S. Pat. No. 6,285,462 INTELLIGENT GCR/UCR PROCESS TO REDUCE MULTIPLE COLORANT MOIRÉ IN COLOR PRINTING, by Eschbach et al, issued Sep. 4. 2001, the actual GCR/UCR settings influence the moiré between the different separations. In one embodiment of the present invention, the likelihood of moiré to occur at different parts of color space is estimated, e.g.: by the methods outlined in such patent application. More test patches might be allocated to areas of color space that are likely to exhibit moiré.

Another important aspect in the creation of the characterization target is the dot-overlap of the specified halftones. In this case, we can measure the dot-overlap variation of the different separations under separation shift. The reason for this measurement is the estimation of the misregistration sensitivity of the characterization. As in the noise case, the characterization target will have a set of redundant patches to test the reproducibility of the colors. It has been noted that some misregistrations lead to an inconsistent dot overlap as a function of the location on the page, while other misregistrations are better tested by printing multiple characterization or calibration pattern sheets.

The previous sections described an embodiment of this invention that was sensitive to the halftone description. It should be noted that the described invention can also be embodied in a system that does not incorporate halftone knowledge, or that does not use halftones, such as contone printers. The main feature of the described invention is the dynamic creation of calibration sheets based on variable print settings of the output device.

FIG. 5 is a flow chart illustrating the inventive method of calibration when combined with the iterative refinement procedure. At step 500 variable printer settings are loaded and at step 501 and initial target TN is created dependent on the settings. At step 502, the initial target T0 is printed. For step 503, the printer response to target T0 is measured. The response is compared to a chosen printer model at step 504. At step 506, a determination is made to discover whether the comparison shows a deviation that is more than an acceptable amount. If so, from the comparison, areas of concern are identified at step 508. Target TN is generated reselecting the area of concern, at step 510. The calibration target printing process is iterated. If step 506 provides a comparison which demonstrates the printer is performing as predicted, the derived calibration data values are directed to calibration processor 202, to generate a color transform LUT 100. Of course, it may be that the operation of the printer does not converge at the predicted model, in which case, a limited set of iterations, perhaps only one, are required before the data will be directed to the calibration processor.

In standard practice, device independent values may be mapped to device dependent space, perhaps in a manner described in U.S. Pat. No. 5,471,324. Alternatively the method of Po-Chieh Hung, "Colorimetric Calibration for Scanners and Media", SPIE, Vol. 1448, Camera and Input Scanner System, (1991), which describes a method of inverse tetrahedral interpolation, may be used to the same effect as the described Shepard's Method. Of course, other methods are possible. With the look up table derived, it may be stored in LUT 100 at color space transform 20, for use in converting device dependent values received from image creators to device independent printer signals.

In accordance with the invention, an iterative process may be used at the calibration processor to generate calibration test patterns including color samples, measure the samples, compare the sample measurements to a printer model, detect deviations from the expected model in portions of the printer gamut, re-generate calibration test patterns with an emphasis on those parts of the printer gamut that exhibit a large deviation from the model, and use the measurements of the re-generated calibration target to create a new color.

It should be understood that $R_c$, $B_c$, $G_c$ input is used as example only, and that any other calorimetric description might be used on the input. It should also be noted that the color measurement instrumentation might be partly or entirely incorporated into the color printer. In such instances, the dynamic color calibration sheet might be an actually printed piece of paper, or a known part or area of an intermediate image carrier. It is appreciated that reducing the number of patches to be measured is similarly important in manual and automatic calibration situations.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for calibrating a printer comprising:

determining at least one variable print setting to be used on a printer, and using said determined print setting to generate a print setting dependent calibration target having a plurality of printed color samples thereon, said variable print setting being selected from the group including:

(a) a selected halftone dot, (b) a selected moiré-creating choice of operation, (c) a selected halftone screen, (d) a selected resolution, and (e) a selected halftone screen frequency;

printing said calibration target;

measuring each printed color sample in said calibration sheet; and using said measurements to generate a color calibration table for use by said printer in converting device independent colors to device dependent colors.

2. The method as defined in claim 1, wherein said selected moiré-creating choice of operation includes a selected dot-overlap function.

3. The method as defined in claim 1, wherein a characteristic of said selected halftone dot is used to determine output print color instability.

4. The method as defined in claim 3, wherein said halftone characteristic is described as a dispersity value.

5. The method as describe in claim 1, wherein said group of variable print settings includes a selected moiré-creating choice of operation in the form of a gray component replacement and under color removal (GCR/UCR) scheme.

6. A method for generating a calibration target for calibrating a color printing system, comprising:

determining at least one variable print setting to be used on a printer;

using said determined print setting to generate a print setting dependent calibration target having a plurality of printed color samples thereon, said variable print setting being selected from the group including:

(a) a selected halftone dot, (b) a selected moiré-creating choice of operation, (c) a selected halftone screen, (d) a selected resolution, and (e) a selected halftone screen frequency.

7. The method as describe in claim 6, wherein said group of variable print settings includes a moiré-creating choice of operation in the form of a gray component replacement and under color removal (GCR/UCR) scheme.

8. The method as defined in claim 6, wherein said selected moiré-creating choice of operation includes a selected dot-overlap function.

9. The method as defined in claim 6, wherein a characteristic of said halftone dot is used to determine output print color instability.

10. The method as defined in claim 9, wherein said halftone characteristic is described as a dispersity value.

11. A method for calibrating a printer comprising:

determining at least one variable print setting to be used on a printer, and using said determined print setting to generate a print setting dependent calibration target having a plurality of printed color samples thereon;

printing said calibration target;

measuring said generated calibration target so as to provide a measured printer response;

comparing said measured printer response to a printer model for said printer, and identifying at least one area of non-conformance;

generating a second calibration target, dynamically generated to test printer response in the area of non-conformance;

secondarily measuring each printed color sample in said second calibration target for providing a respective secondary measured printer response; and using at least one of said measured printer response and secondary measured printer response to generate a color calibration table for use by said printer in converting device independent colors to device dependent colors.

12. The method as defined in claim 11, wherein the step of generating a second calibration target further comprises the step of generating an increased number of color samples in one or more regions of printer operational parameters.

13. The method as defined in claim 11, wherein the step of generating a second calibration target further comprises the step of generating a reduced number of color samples in one or more smooth color space regions.

14. The method as defined in claim 11, further comprising the step of offering an option to use the current calibration or to fine-tune the calibration.

15. The method as defined in claim 11, wherein a selected area of non-conformance is determined according to a change in a gradient in a color space of the calibration function as compared to an expected performance.

16. The method as defined in claim 11, wherein a selected area of non-conformance is determined according to a change in curvature of the calibration function.

17. The method as defined in claim 11, wherein a selected area of non-conformance is determined according to the presence of at least two identical color patches resulting in different measured responses.

* * * * *